United States Patent Office 3,096,263
Patented July 2, 1963

3,096,263
NUCLEAR REACTOR FUEL ELEMENTS AND
METHOD OF PREPARATION
Walter E. Kingston, Bayside, Bernard Kopelman, Flushing, and Henry H. Hausner, New York, N.Y., assignors, by mesne assignments, to the United States of America as represented by the United States Atomic Energy Commission
No Drawing. Filed Apr. 1, 1952, Ser. No. 279,910
23 Claims. (Cl. 204—154.2)

This invention relates to improved fuel elements for nuclear reactors or atomic piles and to a method for preparing them. More particularly, this invention relates to such elements containing uranium as the fissionable material or fuel.

As conducive to a clearer understanding of this invention, certain terms as well as the reactions that may take place in a pile utilizing uranium, will be explained.

Naturally occurring uranium has an isotopic composition of 99.28% $U^{238}$, 0.71% $U^{235}$ and 0.005% $U^{234}$ and the term "natural uranium" will have this meaning in the present application. Enriched uranium designates an isotopic composition with a higher $U^{235}$ percentage than natural; and depleted uranium has a lower percentage. $U^{235}$ refers to the substantially pure isotope unless otherwise modified and $U^{238}$ has a like meaning. Methods are known in the art for carrying out enrichment. These terms are used whether the uranium is present as the metal or in chemical combination.

In a reactor, capture of a neutron by $U^{238}$ leads to the formation of plutonium; whereas capture of a neutron by $U^{235}$ leads to the formation of fission fragments of the atom, the release of neutrons and of energy. Thus the $U^{235}$ serves as a neutron multiplier, or source, or fuel; and provides, in addition to fission fragments, a tremendous amount of energy. The energy which is released arises from the excess mass of the original $U^{235}$ nucleus and impinging neutron over that of the final stable products, in accordance with the mass-energy equivalence.

It will thus be seen that reactors may be used to generate power and as substitutes for other types of power plants, with uranium taking the place of other sources of energy such as coal. In addition, the fission products which are radioactive, are useful for many biological and medical applications such as for tracers and for treating disease and for tracers in industrial investigation; and this is also true of elements which are deliberately exposed to the neutron bombardment to render them radioactive. Hence, reactors have various industrial, peacetime uses. The fuel elements of this invention are particularly useful for reactors intended to generate power and in which enriched uranium is used as in relatively smaller, lighter mobile units for planes and ships.

The problem with which this invention is concerned will be better understood by reference to the physical structure of one useful form of reactor. It consists essentially of a block of a moderator material such as graphite in which channels, suitably cylindrical, are formed. Each channel is lined with a metal tube, such as an aluminum tube, and cylindrically shaped rods of jacketed uranium metal are held within the tubes. The uranium rods are tightly sealed within jackets of a metal such as aluminum, zirconium, beryllium, etc. A coolant, i.e., a heat transfer medium such as water is forced at high velocity through a space between the uranium rod and the metal tube. In operation, the uranium fuel elements are subjected to temperature cycles, neutron bombardment and the release of fission products as a result of neutron capture and splitting of $U^{235}$ atoms. In consequence, and it is believed resulting from damage caused by fission products which disrupt the metallic lattice about the fissioning atom, the fuel elements undergo serious dimensional changes which are undesirable. Detailed information concerning the operation of nuclear reactors is given in an application of Fermi and Szilard, Serial No. 568,904, filed December 19, 1944, now Patent No. 2,708,656, issued May 17, 1955.

The specific problem sought to be overcome by this invention is the warping or buckling of the fuel elements with resultant marked changes in their physical dimensions.

Although the above has been explained with reference to one physical form of pile, it will become evident that this invention is applicable when other forms are used. For example, the fuel element need not be in the shape of a cylindrical rod but may be a flat plate. As a heat transfer medium one may use a liquid other than water, or a gas such as helium, or a liquid metal such as mercury, sodium, alloys of sodium and potassium, lead-bismuth alloys and bismuth. Another moderator, such as beryllium, may be employed. The uranium may have the natural or an enriched isotopic composition. The reactor may be a fast reactor instead of the thermal type described above and in such instances the moderator will be omitted.

When the circulating fluid is water, for example, it may be taken from a natural source such as a river and eventually returned to the source. Alternatively, after passage through the pile, it may come in contact with power plant machinery and be recirculated. It is therefore important that the water should not become appreciably contaminated with radioactive materials. It should be noted that the uranium fuel elements are completely sealed within metal jackets that are resistant to corrosion by the water under the conditions of use. However, if there should be a rupture of the jacket, such as might be caused by warping of the fuel element owing to fission damage, escape of the highly radioactive fission products into the water stream will occur thereby seriously contaminating it. Entrance of water into the jacket will also result in chemical action between the uranium and the water. Because the reaction product is of lower density than the metal itself, the rod will expand with consequent harmful effects on the flow rate and difficulty in removing the swollen rod. Warping alone will be sufficient to cause such obstruction. Similar considerations apply when another circulating medium is used, such as a liquid metal.

Accordingly, it is a general object of this invention to provide a novel uranium containing reactor fuel element.

Another object of the invention is to improve the operation of atomic piles by providing fuels in improved form.

Another object of the invention is to provide a uranium containing fuel element of improved dimensional stability, and a method of making the same.

Another object of the invention is to mitigate the effects of fission damage in such elements.

It is considered that if particles containing natural or enriched uranium are dispersed in a body of another metal and maintained in separated areas, it becomes possible that the individual zones of fission damage will not intersect to form a continuous zone of fission damage, with the result that there will be an unaffected skeleton structure capable of maintaining the original dimensions of the fuel element. To this end it is important that the particles should not become atomically dispersed to an appreciable extent in the metal body or matrix, such as by dissolving in or forming a compound therewith. On the contrary, they should remain in discrete, isolated areas and the solid phase of the particles should be sharply defined from the solid phase of the metal medium in which they are distributed. A wide variety of metals may be used for the matrix. The metal chosen will normally have physical properties such as ductility such that it can be readily handled and fabricated into shapes. Preferably it will have a relatively low neutron cross section capture. Examples of useful metals are steel, nickel, chromium, titanium, and preferably aluminum, zirconium and beryllium. It is also within the scope of this invention to employ $U^{238}$ as the matrix metal since it does not undergo significant fission by neutrons. It is further contemplated to employ natural uranium as the matrix metal when the particles distributed therethrough contain enriched uranium. In this instance, and as compared with a fuel element containing a core consisting of natural uranium, it is possible to obtain a given neutron output in a shorter length of time and before the natural uranium of the matrix has had an opportunity to undergo appreciable fission damage.

One difficulty that arises in the preparation of fuel elements having discrete areas of natural or enriched uranium in a metal matrix, is that under fabrication conditions the uranium metal powder alloys with various metals and even undergoes self-diffusion with another uranium powder used as the matrix metal so that the desired intimate structure cannot be achieved. An essential feature of this invention is therefore that the fuel material be distributed in discrete areas in the metal body, in the form of uranium carbide or uranium nitride. The mono- or di-form or mixtures thereof of either compound may be employed, uranium di-carbide being preferred. On the other hand, the matrix metal may be used in the form of the metal, its alloy, or metal hydride, inasmuch as the hydrides generally decompose at fabricating temperatures. The use of metal hydrides for making parts is described in an application of R. P. Angier, Serial Number 203,042, filed December 27, 1950, now U.S. Patent No. 2,823,116, issued February 11, 1958. A particularly effective method of preparing the fuel elements is to mix a powder of the aforesaid compound with a powder of the matrix metal, compact and sinter the mixture. The mixture may be pressed within a die and subsequently sintered. The temperature of the sintering step will depend to a large extent on the sintering temperature of the matrix metal. Alternatively, hot pressing may be employed at temperatures of at least 300° C. and preferably not above 750° C. although they may be higher, e.g., about 1000° C. In the case of uranium it is desirable not to heat above 660° C. in order to maintain the uranium in the alpha phase and ensure minimum grain growth and maximum dimensional stability, and a preferred hot pressing temperature range is about 450° C. to 660° C. For beryllium a preferred hot pressing temperature range is about 450° C. to 660° C.; for zirconium it is about 600° C. to 750° C. Powder metallurgical techniques are preferred over melting techniques because in melting, the heavier component of the mixture tends to settle to the bottom by gravity; and the relatively higher temperatures are conducive to oxidation of metal. The article so produced constitutes the core of the element and it may subsequently be encased in a metal sheath or jacket, for example, steel, nickel, chromium, titanium, tantalum, aluminum, zirconium or beryllium, the latter three being preferred. The material of the sheath will normally have good fabricating properties, e.g., ductility. It will preferably have a relatively low neutron capture cross section and high resistance to corrosion by the cooling or heat transfer medium.

As regards obtaining an intimate structure of the article such that discontinuity of the individual zones of fission damage can be achieved, it will be seen that this depends upon several factors, e.g., the degree of enrichment of the uranium carbide or nitride; the size of the particles of the latter; and the concentration thereof in the metal body. Decreasing the enrichment of the uranium in the particles decreases fission damage generally. Increasing the particle size, for a given concentration, results in a greater separation between particles and decreases the probability of intersection of fission damage zones. Decreasing the concentration of the compound, for a given particle size, has a like effect. It may frequently be desirable that the isotopic composition of the uranium compound be such that it contains at least 5% $U^{235}$ and higher, up to about 100%. The size of the particles of the compound is advantageously in the range of 10 to 250 microns. The concentration of the compound is such that there is at least sufficient metal present to form a continuous metal structure and afford ductility to the article as initially produced, and frequently the compound will be present in a minor amount or less than 50 percent by weight. As typical of the selection of values for these factors, a mixture of $U^{235}C_2$ having a particle size of about 100 microns is mixed with zirconium metal powder in a concentration of two atomic percent uranium of total metal. The selection of other values for these factors favorable for mitigating the effects of fission damage, will be apparent to those skilled in the art.

Uranium nitride may be prepared by introducing a quartz boat containing for example —100 mesh uranium powder into a furnace heated at a temperature of about 1150° C. to about 1400° C., in which a purified nitrogen atmosphere is maintained. An exothermic reaction takes place to yield principally the dinitride, $UN_2$.

Uranium monocarbide, UC, may be obtained by direct combination of the two elements. Thus, 5.25 gs. of lampblack and 99.5 gs. of —325 mesh uranium powder were compacted at 100 t.s.i. The compact was sintered between two zirconia slabs in vacuum at 1250° C. for 70 hours. A solid and homogeneous bar brittle enough for good grinding was obtained.

Uranium dicarbide may be made by either of the following two methods:

(1) $$UO_2 + 4C \rightarrow UC_2 + 2CO$$
(2) $$U + 2C \rightarrow UC_2$$

The oxide reduction was accomplished by pressing a mixture of 20 gs. of lampblack and 80 gs. of $UO_2$ at 80 t.s.i., and heating the compact in a graphite crucible at 2100° C. for 1½ hours. In the second method, uranium pellets were heated in a thick walled graphite crucible to about 2375° C. The carbon necessary for the reaction is dissolved from the crucible itself and it must be sawed open to remove the ingot.

Fractions having an average particle size of 100 microns (—140 +170 mesh) of any of these compounds are obtained by grinding the material on vibrating screens with ball bearings on the screens and removing the desired fraction. Any free carbon present in particles of carbide may be removed by flotation with acetylene tetrabromide. The latter is readily removed by washing with ether. Fractions having an average particle size of 10 microns are obtained by grinding larger particles with ball bearings while the material is being classified in a roller analyzer. The roller analyzer is essentially a gas elutriator which classifies material by carrying all particles below a critical size, for which flow has been set, through a vertical classification chamber of known diameter and into a paper thimble. All particles above the critical size are retained or fall back into an oscillating U-tube in which the charge is placed originally. The modification is made by adding fifty ⅛ inch ball bearings to the charge in the analyzer. Motion of the lower U-tube agitates the ball bearings and they grind the particles to below 11 microns. The continuous gas flow carries the particles away before they are ground below 9 microns. Thus, the material is carried over into the collection thimble by the gas flow and not over ground, resulting in a high yield.

The present invention is illustrated by the following examples.

*Example 1*

A mixture of —325 mesh $ZrH_2$ and —80, +140 mesh enriched uranium nitride (produced at 1150° C.) in a proportion such as to give 10% by weight of uranium based on total metal in the final sintered product, was tumbled for two hours in an argon filled, sealed bottle.

The mixture was compacted in a die at 70 t.s.i. at room temperature in air to a density of 5.07 gs./cm.$^3$. The compact was placed in a $ZrO_2$ boat between $ZrO_2$ slabs and sintered for thirty minutes at 1290° C. in high vacuum. The product had a density of 6.44 gs./cm.$^3$, substantially the theoretical density, and the uranium nitride particles averaged about 150 microns in diameter.

*Example 2*

The same mixture employed in Example 1 was pressed under the same conditions and sintered at 1230° C. for ten minutes. The product had a density of 6.29 gs./cm.$^3$.

*Example 3*

A mixture of —400 mesh $ZrH_2$ and —140, +200 mesh uranium nitride (produced at 1400° C.) in a proportion such that the final sintered product contained 2 atomic percent uranium based on total metal, was tumbled in an argon filled, sealed jar for two hours. The mixture was pressed in a die at 70 t.s.i. at room temperature in air and the compact was sintered for ten minutes at 1230° C. in high vacuum. The product had a density of 6.43 gs./cm.$^3$.

On the basis of photomicrographs made of the above samples and of a spot test for uranium in which a microchemical analysis is made of areas of about 25 microns, it was concluded that the uranium in the particles incorporated in the above manner remained in the places in which they originally were located in the pressed compact and did not diffuse substantially into the zirconium during sintering. To carry out the spot test, the sample was coated with a thin film of transparent paraffin wax. The wax was removed from a small, desired area with a pin point while the sample was viewed under the microscope. A drop of a solution containing 2% HF and 20% $HNO_3$ in water was inserted in the hole where the wax had been removed. After the drop had reacted chemically with the area, it was absorbed on a strip of smooth filter paper which had been cut to a point. The strip was then dipped into a concentrated solution of potassium ferrocyanide. If uranium was present, a brown color appeared on the edge of the paper strip. Zirconium and hafnium yield a blue color under these conditions and do not hinder the test. This test for uranium is sensitive to at least eight parts per million under these conditions. In this way, areas seen under the microscope which appeared to be between particles of uranium nitride, were subjected to the spot test and showed no uranium within the limits of the test.

*Example 4*

A mixture of —325 mesh $ZrH_2$ powder and uranium nitride having an average diameter of 10 microns, in a proportion such that 2 atomic percent of uranium based on total metal was present in the final sintered article, was tumbled in an argon filled, sealed bottle for four hours. The mixture was then pressed in a die at 100 t.s.i. The compact was placed in a $ZrO_2$ boat between $ZrO_2$ slabs and sintered for ten minutes at 1100° C. under a vacuum of .10–.01 micron Hg. The product had a density of 6.52 gs./cm.$^3$.

*Example 5*

A mixture of —200 mesh Zr and —140, +200 mesh $UC_2$ in a proportion such that the final article contained 2 atomic percent uranium based on total metal, was pressed in a die at 80 t.s.i. and then sintered for ten minutes at 1200° C. to give a material having a density of 6.25 gs./cm.$^3$.

*Example 6*

$ZrH_2$ powder of —325 mesh size was thoroughly mixed with $UC_2$ powder of the size described in Example 6 in a proportion to give a final product containing 2 atomic percent uranium of the total metal. The mixture was compacted in a die at 80 t.s.i. and then sintered for ten minutes at 1150° C. to give a material having a density of 6.44 gs./cm.$^3$.

Pyrophoric materials such as, for example, powders of zirconium, uranium or uranium hydride, must be protected from air during sintering and this is suitably done by maintaining a high vacuum or an atmosphere of an inert gas such as argon. The former is preferred because of the difficulty of obtaining high purity argon.

In similar fashion to the above, cores may be prepared by pressing and sintering, using uranium nitride or carbide and beryllium as the matrix metal. A useful temperature range for sintering these mixtures is from about 1000° C. to about 1235° C. Uranium-beryllium alloys such as described in an application of R. P. Angier, Serial Number 203,043, filed December 27, 1950, now U.S. Patent No. 2,979,399, issued April 11, 1961, may also be used as the matrix metal. A useful temperature range for pressing and then sintering a mixture of uranium carbide or nitride and zirconium is about 1050° C. to 1300° C.

The core may then be jacketed by dipping it in a low melting point solder or alloy to promote bonding, and then sealing it within a tightly fitting metal can, as explained in an application of W. E. Kingston and S. B. Roboff, Serial Number 250,822, filed October 11, 1951, now U.S. Patent No. 2,993,786, issued July 25, 1961. Alternatively the core may be sealed within the can by hot pressing below the melting points of the metals of the assembly. Other methods may also be used.

Fuel elements prepared as illustrated in the above examples were exposed to neutron bombardment within a nuclear reactor for a period of several months and were found to have satisfactory dimensional stability.

The following examples illustrate the use of the hot pressing technique for forming the core, and also the use of uranium as the matrix metal which is advantageously hot pressed in the alpha phase at temperatures in the range of 450° C. to 660° C. Sintering in the beta phase is done from 950° C. to 1130° C.

*Example 7*

A mixture of —325 mesh uranium powder and 5% by weight of 100 micron $U^{235}C_2$ was hot pressed at about 630° C. and 25 t.s.i. in high vacuum for about five minutes to form a 2 inch square bar.

*Example 8*

A mixture of uranium powder and 5% by weight of 10 micron $UC_2$ was hot pressed at about 640° C. and 100 t.s.i. in high vacuum for five minutes to form a 2 inch square bar.

*Example 9*

A mixture of —325 mesh zirconium powder and 5% by weight of 10 micron $UC_2$ was hot pressed in a die at 600° C. for four minutes in high vacuum to form a 2 inch square bar.

Since many embodiments might be made of the present invention and since many changes might be made in the embodiment described, it is to be understood that the foregoing description is to be interpreted as illustrative only and not in a limiting sense.

We claim:

1. The method of incorporating uranium in discrete areas in a beryllium matrix which comprises the steps of mixing a compound in powder form selected from the group consisting of uranium nitride and uranium carbide, with beryllium powder, compacting the mixture and sintering the mixture.

2. The method of incorporating uranium in discrete areas in a zirconium matrix which comprises the steps of mixing a compound in powder form selected from the group consisting of uranium nitride and uranium carbide, with zirconium powder, compacting the mixture and sintering the mixture.

3. The method of incorporating uranium in discrete areas in a zirconium matrix which comprises the steps of mixing a compound in powder form selected from the group consisting of uranium nitride and uranium carbide, with zirconium hydride powder, compacting the mixture and sintering the mixture thereby causing the decomposition of the zirconium hydride to zirconium metal.

4. The method of incorporating uranium in discrete areas in a zirconium matrix which comprises the steps of mixing a compound in powder form selected from the group consisting of uranium nitride and uranium carbide, with zirconium powder, compacting the mixture and then sintering the compact at a temperature between 1050° C. and 1300° C. in vacuum.

5. The method of incorporating enriched uranium in discrete areas in a uranium matrix which comprises the steps of mixing a compound in powder form selected from the group consisting of enriched uranium nitride and uranium carbide, with uranium powder, compacting the mixture and sintering the mixture.

6. The method of incorporating $U^{235}$ in a uranium matrix which comprises the steps of mixing a compound in powder form selected from the group consisting of uranium nitride and uranium carbide, the uranium of said compound being substantially entirely of mass 235, with uranium powder, compacting the mixture and sintering the mixture.

7. The method of incorporating uranium in discrete areas in a beryllium matrix which comprises the steps of mixing a compound in powder form selected from the group consisting of uranium nitride and uranium carbide, with beryllium powder and hot pressing the mixture at a temperature within the range of about 450° C. to 660° C.

8. The method of incorporating uranium in discrete areas in a zirconium matrix which comprises the steps of mixing a compound in powder form selected from the group consisting of uranium nitride and uranium carbide, with zirconium powder, and hot pressing the mixture at a temperature within the range of about 600° C. to 750° C.

9. The method of incorporating uranium in discrete areas in a zirconium matrix which comprises the steps of mixing a compound in powder form selected from the group consisting of uranium nitride and uranium carbide, with zirconium hydride powder, and hot pressing the mixture at a temperature within the range of about 600° C. to 750° C.

10. The method of incorporating enriched uranium in discrete areas in a uranium matrix which comprises the steps of mixing a compound in powder form selected from the group consisting of enriched uranium nitride and uranium carbide, with uranium powder and hot pressing the mixture at a temperature within the range of about 450° C. to 660° C.

11. The method of incorporating $U^{235}$ in a uranium matrix which comprises the steps of mixing a compound in powder form selected from the group consisting of uranium nitride and uranium carbide, the uranium of said compound being substantially entirely of mass 235, with a uranium powder and hot pressing the mixture at a temperature within the range of about 450° C. to 660° C.

12. The method of incorporating uranium in discrete areas in a metal matrix which comprises the steps of mixing uranium nitride powder with a metal powder and hot pressing the mixture at a temperature within the range of about 300° C. to 1000° C.

13. The method of incorporating uranium in discrete areas in a metal matrix which comprises the steps of mixing a compound in powder form selected from the group consisting of uranium nitride and uranium carbide with a metal powder, and hot pressing the mixture at a temperature within the range of about 300 to 1000° C.

14. A fuel element core for a nuclear reactor which comprises a solid coherent zirconium matrix containing in discrete areas, particles of a compound selected from the group consisting of uranium nitride and uranium carbide.

15. A fuel element core for a nuclear reactor which comprises a solid coherent beryllium matrix containing in discrete areas, particles of a compound selected from the group consisting of uranium nitride and uranium carbide.

16. A fuel element core for a nuclear reactor which comprises a solid coherent zirconium matrix containing in discrete areas, particles of a compound selected from the group consisting of uranium nitride and uranium carbide and having an average particle size of from 10 microns to 250 microns.

17. A fuel element core for a nuclear reactor which comprises a solid coherent uranium matrix containing in discrete areas particles of a compound selected from the group consisting of enriched uranium nitride and uranium carbide.

18. A fuel element for a nuclear reactor which comprises a core of a solid coherent metal matrix containing in discrete areas, particles of a compound selected from the group consisting of uranium nitride and uranium carbide, and a metal cladding.

19. A fuel element for a nuclear reactor which comprises a core of a solid coherent metal matrix containing in discrete areas, particles of a compound selected from the group consisting of uranium nitride and uranium carbide, and a cladding of zirconium.

20. A fuel element for a nuclear reactor which comprises a core of a solid coherent zirconium matrix containing in discrete areas, particles of a compound selected from the group consisting of uranium nitride and uranium carbide, and a cladding of zirconium.

21. A fuel element for a nuclear reactor which comprises a core of a solid coherent uranium matrix containing in discrete areas, particles of a compound selected from the group consisting of enriched uranium nitride and uranium carbide, and a cladding of zirconium.

22. A fuel element for a nuclear reactor which comprises a core of a solid coherent metal matrix containing in discrete areas, particles of a compound selected from the group consisting of uranium nitride and uranium carbide, and a cladding of aluminum.

23. A fuel element for a nuclear reactor which comprises a core of a solid coherent metal matrix containing in discrete areas, particles of a compound selected from the group consisting of uranium nitride and uranium carbide, and a cladding of beryllium.

References Cited in the file of this patent

UNITED STATES PATENTS

| | | |
|---|---|---|
| 1,864,567 | Walter | June 28, 1932 |
| 1,981,719 | Comstock | Nov. 20, 1934 |
| 2,123,416 | Graham | July 12, 1938 |
| 2,526,805 | Carter et al. | Oct. 24, 1950 |

FOREIGN PATENTS

| | | |
|---|---|---|
| 861,390 | France | Oct. 28, 1940 |

OTHER REFERENCES

Powder Metallurgy, Its Physics and Production by Dr. Paul Schwarzkopf, published by MacMillan and Co., New York, pages 158, 202–204.

Sourcebook of Atomic Energy by Samuel Glasstone, published by D. Van Nostrand Co., New York, pages 390, 391, 392.